United States Patent
Claramunt Estecha et al.

(10) Patent No.: US 11,280,320 B2
(45) Date of Patent: Mar. 22, 2022

(54) YAW SYSTEM FOR A WIND TURBINE

(71) Applicant: General Electric Renovables España, S.L., Barcelona (ES)

(72) Inventors: Santiago Claramunt Estecha, Barcelona (ES); Javier Garcia Cervilla, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 165 days.

(21) Appl. No.: 16/693,824

(22) Filed: Nov. 25, 2019

(65) Prior Publication Data

US 2020/0173424 A1   Jun. 4, 2020

(30) Foreign Application Priority Data

Nov. 29, 2018   (EP) ..................................... 18382867

(51) Int. Cl.
  *F03D 80/50*   (2016.01)
  *F03D 80/70*   (2016.01)
(52) U.S. Cl.
  CPC ............. *F03D 80/50* (2016.05); *F03D 80/70* (2016.05)
(58) Field of Classification Search
  CPC .. B23P 6/00; B23P 6/005; F03D 80/50; F03D 80/70; F05B 2230/70; F05B 2230/80; F05B 2240/52; F16C 17/10
  See application file for complete search history.

(56) References Cited

U.S. PATENT DOCUMENTS

| 8,371,030 | B2 | 2/2013 | Shiraishi et al. |
| 9,689,174 | B2 | 6/2017 | Gotfredsen |
| 2006/0292349 | A1 | 12/2006 | Seely |
| 2013/0071246 | A1 | 3/2013 | Kari et al. |
| 2015/0047270 | A1* | 2/2015 | Gotfredsen ............. F16C 33/26 52/123.1 |

(Continued)

FOREIGN PATENT DOCUMENTS

| EP | 2388480 B1 | 10/2013 |
| EP | 2679815 A1 | 1/2014 |

(Continued)

OTHER PUBLICATIONS

European Search Report Corresponding to EP18382867 dated May 8, 2019.

*Primary Examiner* — Christopher J Besler
(74) *Attorney, Agent, or Firm* — Dority & Manning, P.A.

(57) ABSTRACT

In a first aspect, a method for removing a gliding pad of a gliding yaw bearing of a wind turbine is provided. The method comprises selecting a gliding pad to be removed, rotating a nacelle to a removal position and removing the selected gliding pad. In a further aspect, a gliding yaw bearing for a wind turbine is provided. The gliding yaw bearing comprises a first bearing component configured to be coupled to a tower of a wind turbine and a second bearing component configured to be coupled to a nacelle of a wind turbine. The first bearing component is configured to rotate with respect to the second bearing component. The gliding yaw bearing further comprises one or more axial gliding pads arranged between the first and the second bearing components. In yet a further aspect, a wind turbine comprising examples of yaw bearings according to any of the examples herein disclosed is provided.

8 Claims, 7 Drawing Sheets

(56) References Cited

U.S. PATENT DOCUMENTS

2021/0115905 A1* 4/2021 Dow ...................... F03D 80/70

FOREIGN PATENT DOCUMENTS

| EP | 2837818 A1 | 2/2015 | | |
|----|------------|--------|---|---|
| EP | 3165764 A1 | 5/2017 | | |
| ES | 2 326 852 A1 | 10/2009 | | |
| ES | 2326851 A1 | 10/2009 | | |
| WO | WO-2019203783 A1 * | 10/2019 | ............. | F03D 80/50 |

* cited by examiner

YAW SYSTEM FOR A WIND TURBINE

The present disclosure relates to gliding yaw bearings for wind turbines, wind turbines comprising such gliding yaw bearings and methods for removing a gliding pad of a gliding yaw bearing.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

Most wind turbines comprise a yaw system used for orienting the rotor of the wind turbine in the prevailing wind direction. Normally, when the rotor is aligned with the wind direction, the yaw system maintains the position by means of brakes (e.g. hydraulic brake calipers and/or electro-brakes of the yaw motors). When the rotor is misaligned from the wind direction the yaw system rotates the nacelle to reach an appropriate alignment with the wind.

The yaw system normally performs this rotation of the nacelle by means of a yaw drive that includes a plurality of (electric or hydraulic) motors with suitable gearboxes for driving gears (pinions) that mesh with an annular gear or gear ring attached to the nacelle or to the wind turbine tower. The nacelle can thus be rotated around the tower's longitudinal axis in or out of the wind direction. The rotatable connection between the wind turbine tower and the nacelle is called a yaw bearing. The yaw bearing can be of the roller or gliding type.

Gliding yaw bearings or sliding yaw bearings may be used in large wind turbines because they are cheaper than roller yaw bearings and are able to withstand high loads in axial and radial directions. Gliding or sliding yaw bearings may include an annular gear or gear ring configured to be fixed to the tower wherein the frame of the nacelle may rest and slide in its yawing movement. Lubrication, e.g. oil or grease, may be applied between the annular gear and the frame of the nacelle for allowing the frame to rotate with respect to the annular gear. Lubrication reduces the friction between the annular gear and the frame of the nacelle and avoids the wear of the annular gear and/or the frame. In addition, sliding or gliding pads may be provided between the annular gear and the frame to avoid a direct contact between them. Accordingly, the gliding yaw bearings usually comprise top axial gliding pads arranged between the upper surfaces of the annular gear and the frame, bottom axial gliding pads arranged between the bottom surfaces of the annular gear and the frame and radial gliding pads arranged between the radial surfaces of the annular gear and the frame. These pads are attached directly or indirectly to the main support of the nacelle.

These gliding pads generally suffer from wear, in particular in heavy wind turbines, e.g. offshore wind turbines. The sliding or gliding pads may thus need to be periodically repaired or replaced. However, replacing these pads is generally very complex and costly.

In some examples, the bottom axial gliding pads and the radial gliding pads may be attached to brackets connected to the frame of the nacelle. Disconnecting these brackets from the frame allows facilitating the removal of the bottom axial gliding pads and the radial gliding pads from the frame. However, in order to remove the top axial gliding pads, an extra operation may further be required.

It is known to use an external crane to lift the nacelle of a wind turbine for disconnecting the top axial gliding pad from the nacelle. This operation requires heavy and expensive cranes, and is even more complicated with a need for specifically equipped vessels in offshore wind turbines. It has been proposed in the prior art to avoid using external cranes by providing the tower or the nacelle with internal lifting devices. These internal lifting devices can lift the nacelle sufficiently for allowing the top axial gliding pads to be disconnected from the nacelle. However, the tower and/or the nacelle generally need to be reinforced to incorporate such internal lifting devices and specific supports for supporting these lifting devices need to be provided in some cases. These proposals thus increase the cost and the weight of the wind turbine and can reduce the structural strength of the tower and/or of the frame of the nacelle.

The present disclosure provides examples of systems and methods that at least partially resolve some of the aforementioned disadvantages.

SUMMARY

In one aspect, a method for removing a gliding pad of a gliding yaw bearing of a wind turbine is provided. The method comprises selecting a gliding pad to be removed; rotating a nacelle that is rotatably mounted on a tower to a removal position in which a front side of the nacelle at which a rotor is arranged is positioned substantially diametrically opposite to the selected gliding pad, such that the pressure exerted on the selected gliding pad is released and then removing the selected gliding pad.

In this aspect, the rotation of the nacelle may allow reducing the pressure exerted on the selected gliding yaw to be removed.

Removing a gliding pad may be simplified since no external cranes or internal lifting devices may be necessary. Cost and time for replacing a gliding pad may thus be reduced. Maintenance costs of wind turbines may accordingly be reduced.

Furthermore, the structural strength of the wind turbine is not reduced and therefore no additional reinforcements may be necessary. As no reinforcements and internal lifting devices are necessary, the cost of the wind turbine can thus be reduced.

In another aspect, a gliding yaw bearing for a wind turbine is provided. The gliding yaw bearing comprises a first bearing component configured to be coupled to a tower of a wind turbine and a second bearing component configured to be coupled to a nacelle of a wind turbine. The first bearing component is configured to rotate with respect to the second bearing component. The gliding yaw bearing further comprises one or more axial gliding pads arranged between the first and the second bearing components. In addition, the gliding yaw bearing comprises a cut-out for accessing at least one axial gliding pad of the one or more axial gliding pads.

According to this aspect, the gliding pads may be easily removed through the cut-out. In addition, the pressure exerted by the first and the second bearing component on at least one axial gliding pad in the region of the cut-out is released.

In yet a further aspect, a gliding yaw bearing for a wind turbine having receptacles for receiving gliding pads is provided. The gliding yaw bearing comprises a first bearing component configured to be coupled to a tower of a wind turbine and a second bearing component configured to be coupled to a nacelle of a wind turbine. The first bearing component comprises one or more receptacles and is configured to rotate with respect to the second bearing component. The gliding yaw bearing further comprises one or more axial gliding pads arranged between the first and the second bearing components, wherein the one or more axial gliding pads are fitted in the one or more receptacles.

According to this aspect, the axial gliding pads may be easily coupled to the first bearing component. The receptacles may also help holding the gliding pad in a correct position.

Furthermore, when the gliding yaw bearing is mounted in a wind turbine, loads acting on the axial gliding pads may be more uniformly distributed as the axial gliding pads are mounted on the first bearing component. Loads acting on each of the axial gliding pads may vary with the orientation of the nacelle. As the nacelle may be oriented towards the wind direction and the pads are associated with tower, the most stressed pads may vary according to the orientation of the nacelle. Accordingly, wear of the axial gliding pads may also be more uniformly distributed. Maintenance operations involving replacing axial gliding pads may thus be reduced.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
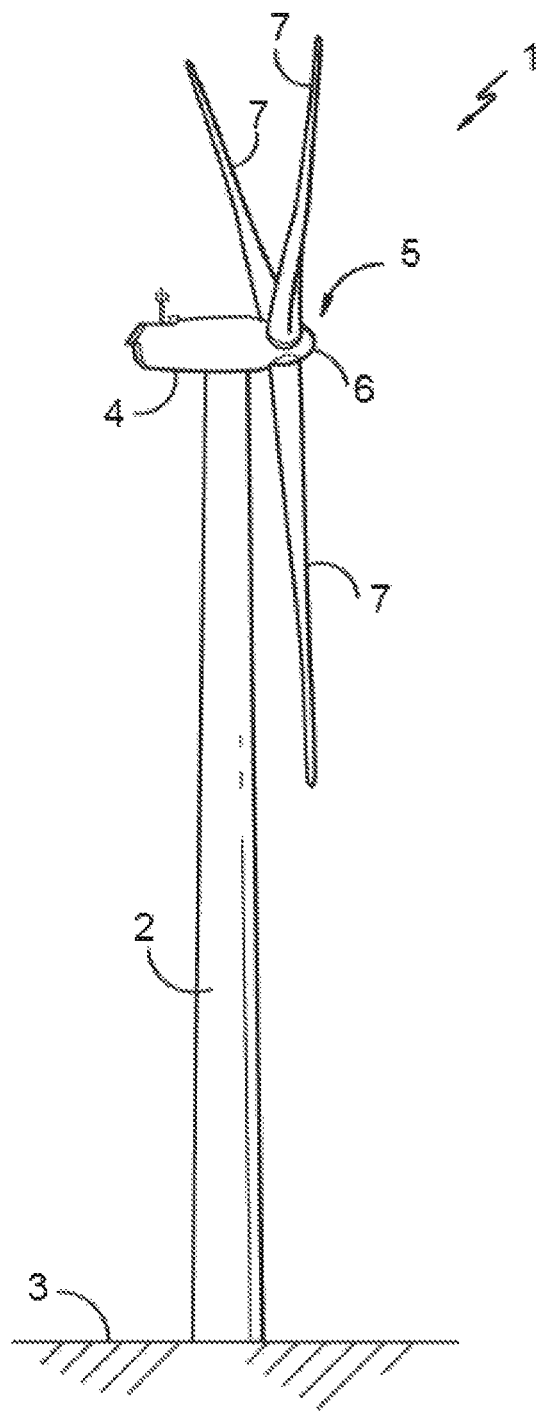
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. The rotation of the rotor may be directly transmitted, e.g. in direct drive wind turbines, or through the use of a gearbox to a generator.

Figure 2:
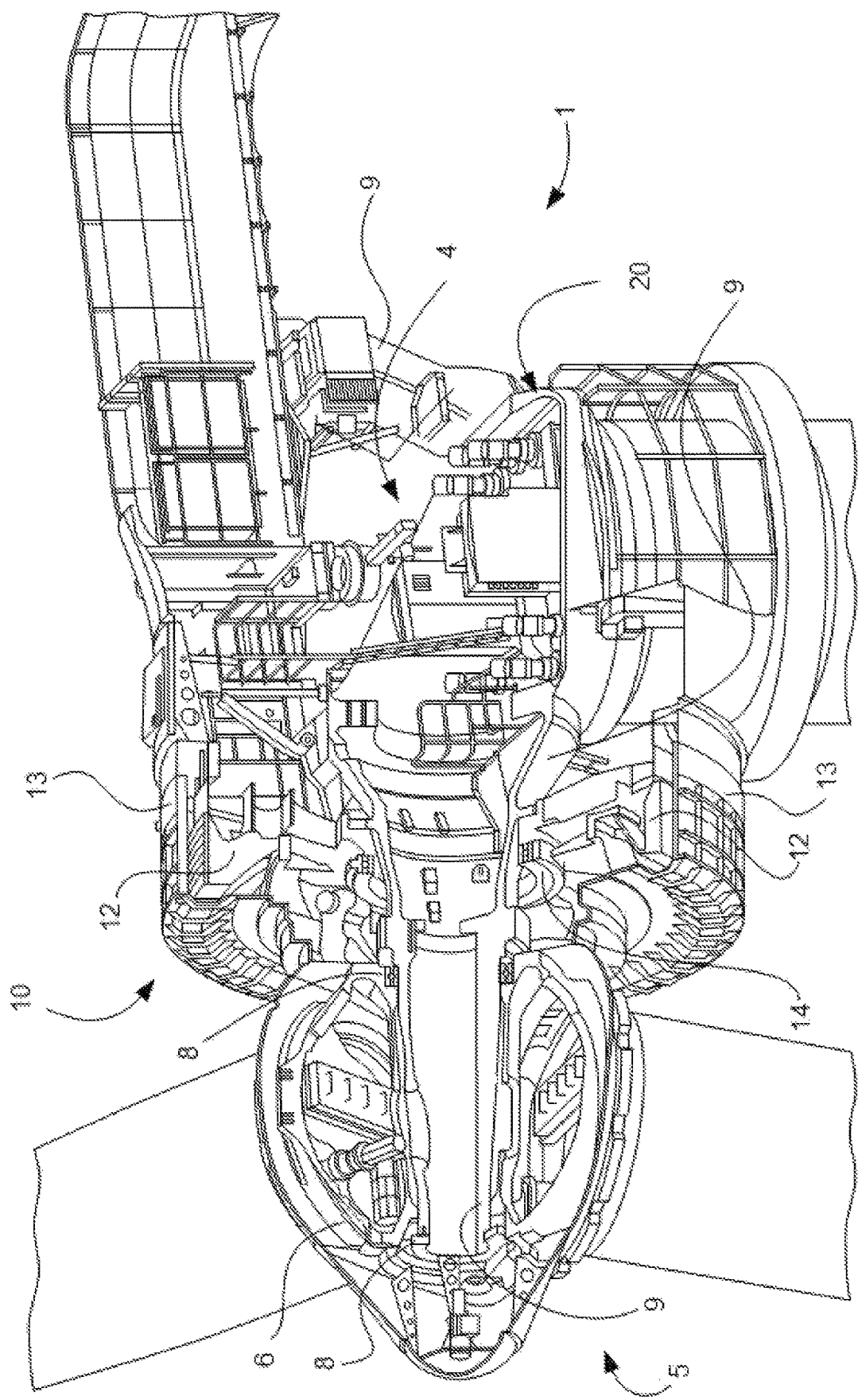
FIG. 2 illustrates a simplified, internal view of a nacelle of a wind turbine according to one example.

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 9 of a generator 10 for rotation therewith. The rotation of the hub 6 may thus drive the rotor 12 of the generator 10.

In FIG. 2, the wind turbine rotor 5 may be rotatably mounted on a support frame 9 through two rotor bearings 8 at a coupling region or a front side. In other examples, the support frame 9 may not extend through the hub 6 and therefore the rotor may be supported by a single rotor bearing 8, commonly called as the main bearing.

The generator 10 may comprise a rotor 12 and a stator 13. The stator may be rigidly mounted on the support frame 9. The rotor may be rotatably mounted on the stator through a generator bearing 14 so that the rotor may rotate with respect to the stator around an axis.

The generator 10 may be electrically coupled to the converter. The wind turbine converter may adapt the output electrical power of the generator to the requirements of the electrical grid. In some examples, the converter may be placed inside the nacelle 4; however, in other examples it may be placed in other locations of the wind turbine.

It should be appreciated that the rotor 5 of the wind turbine and the generator 10 may be supported by a bedplate or a support frame 9 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to a first bearing component and the nacelle 4, e.g. the bedplate or support frame 9, is coupled to the second bearing component.

Figure 3:
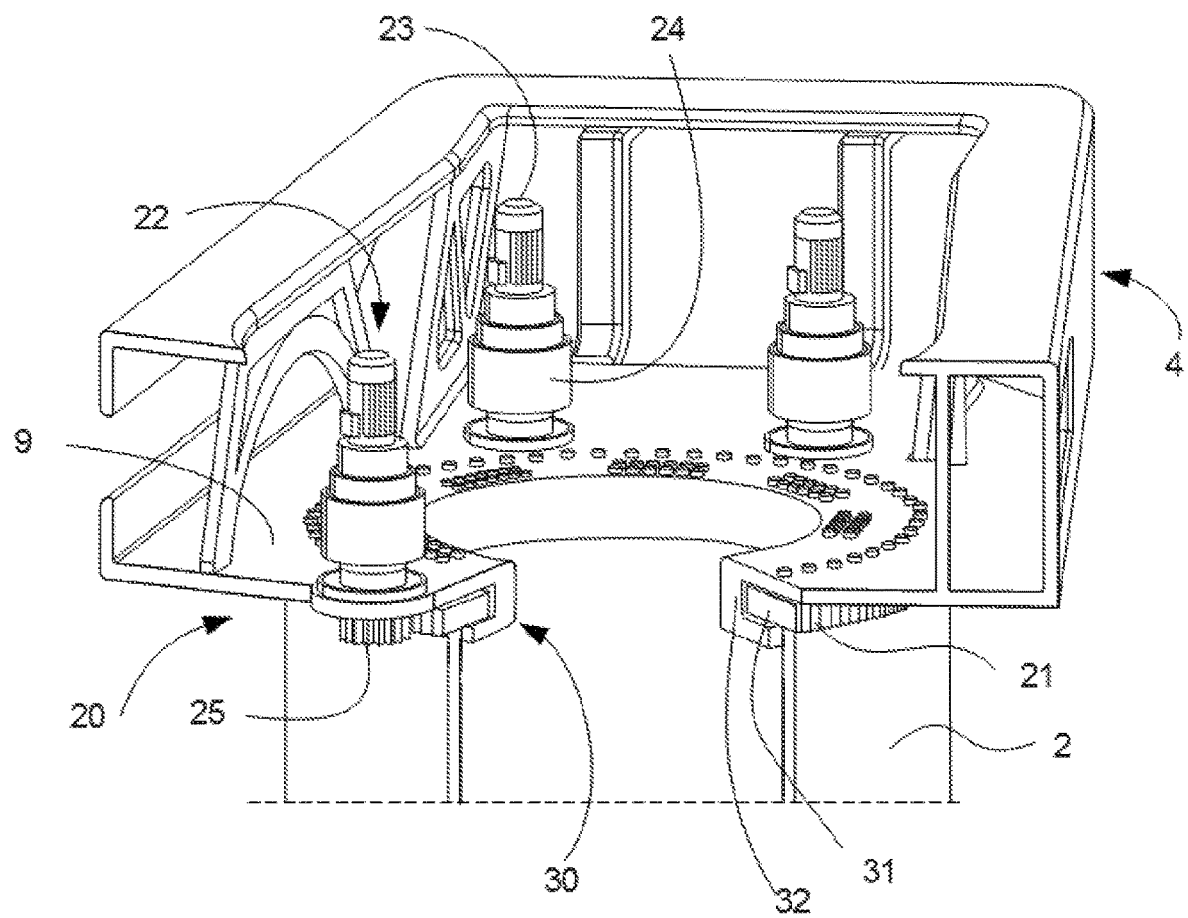
FIG. 3 illustrates an isometric view of a yaw system comprising a gliding yaw bearing according to one example.

FIG. 3 illustrates an isometric view of a yaw system comprising a gliding yaw bearing according to one example. The yaw system 20 comprises a gliding yaw bearing 30 having a first bearing component 31 coupled to the tower 2 and a second bearing component 32 coupled to a nacelle 4. The second bearing component 32 may be coupled or form part of the support frame 9 of the nacelle.

The first bearing component 31 is configured to rotate with respect to the second bearing component 32. In addition, the gliding yaw bearing 30 comprises one or more axial gliding pads (not visible in FIG. 3) arranged between the first bearing component 31 and the second bearing component 32 for reducing the friction between them. The first and the second bearing components exert pressure on the one or more axial gliding pads. The axial gliding pads may thus be clamped between the bearing components.

The gliding pads may be coupled to the first bearing component. For example, the first bearing component may comprise receptacles (not visible in FIG. 3, but discussed later with respect to FIG. 9) in which the gliding pads may be fitted. The receptacles may be configured to receive the axial gliding pads. A connection between the gliding pads and the first bearing component may thus be established. For instance, each one of the gliding pads may be coupled with one different receptacle.

In this example, the first bearing component 31 comprises a gliding plate or gliding track or a gliding disk. The second bearing component 32 of this example comprises a bearing guide or a guiding pad assembly partially enclosing the gliding plate. A portion of the second bearing component 32 may thus partially enclose a portion of the first bearing component 31. The first and second bearing may comprise a top axial gliding surface, a bottom axial gliding surface and a radial gliding surface. The top and the bottom axial gliding surface and the radial gliding surface of the second bearing component in this example substantially define a C-shape. The first bearing component, i.e. the gliding plate, is arranged between these gliding surfaces of the second bearing component, i.e. the guiding pad assembly. The guiding pad assembly may thus guide the rotation of the gliding plate.

In these examples, the guiding pad assembly is placed radially inwards of the gliding plate. However, in other examples, the gliding plate may be placed radially inwards of the guiding pad assembly.

In this figure, the second bearing component 32 may comprise a portion of the support frame 9 or may be coupled to the support frame. The first bearing component 31 may comprise a portion of a tower 2, e.g. a flange, or may be coupled to the tower. In other examples, the first bearing component may comprise a portion of a tower adapter, the tower adapter extending along a vertical axis and configured to be fixedly coupled to a top portion of a wind turbine tower.

The yaw system may comprise an annular gear 21 coupled to the tower 2 and a plurality of yaw drives 22 coupled to the support frame 9. The yaw drives 22 comprise a motor 23, a gearbox 24 and a pinion 25 for meshing with the annular gear 21. The rotation of the gearbox can rotate the pinion with respect to annular gear 21. In this example, first bearing component 31 comprises the annular gear 21. The first bearing component 31 can therefore rotate with respect to the second bearing component 32.

The annular gear 21 may comprise a plurality of teeth which engage with the teeth of the pinions 25 of the yaw drives. In this example, the yaw drives 22 and the annular gear 21 are placed outside the external diameter of the tower. The teeth of the annular gear are outwardly orientated. In some examples, the annular gear 21 may be connected, e.g. welded or fastened, to the guiding plate of the first bearing component. The annular gear 21 and the guiding plate of the first bearing component may form an integral part.

The yaw system may also comprise braking units or brake calipers (not visible in FIG. 3) for braking or blocking the rotation of the first bearing component 31 with respect to the second bearing component 32. The braking units may thus block the rotation of the nacelle with respect to the tower.

Figure 4:
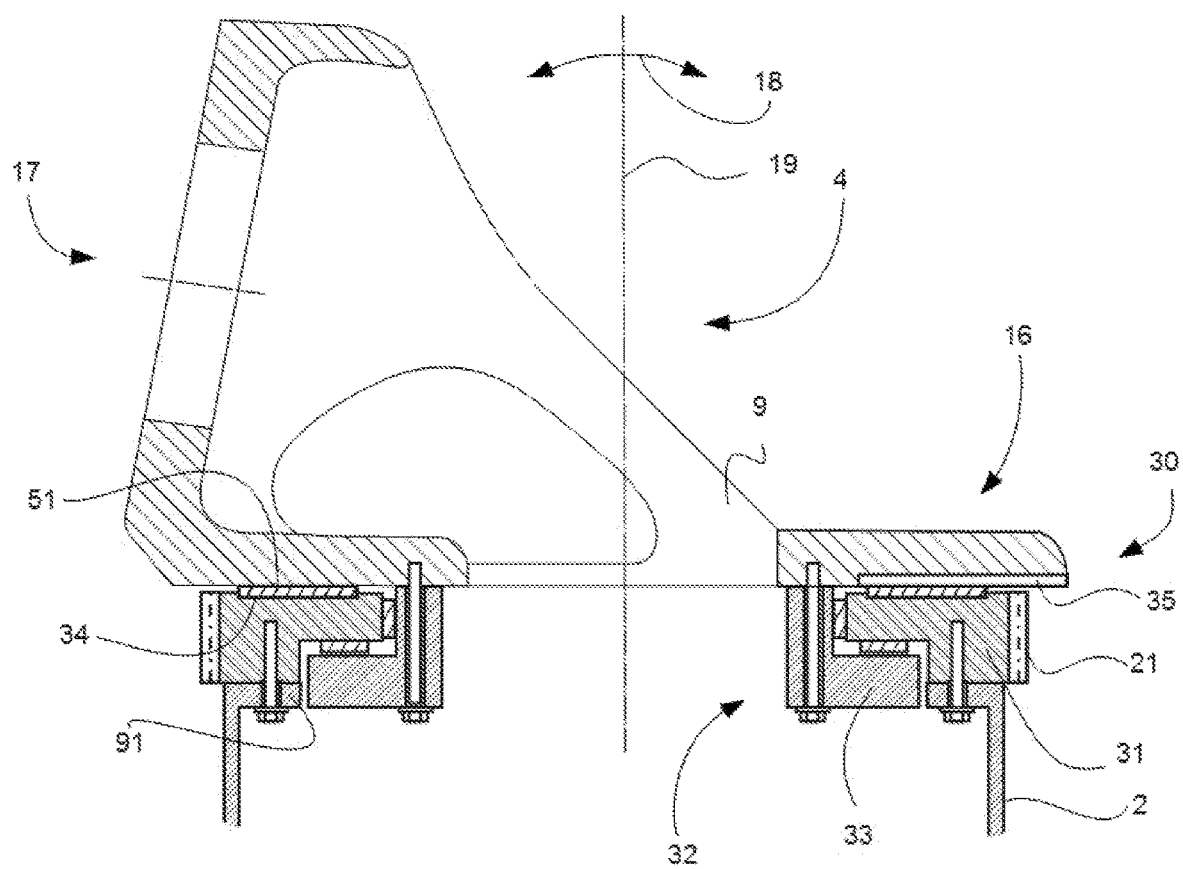
FIG. 4 schematically illustrates a gliding yaw system according to one example.

FIG. 4 schematically illustrates a gliding yaw bearing according to a further example. The gliding yaw bearing 30 in this example comprises a first bearing component 31 coupled to the tower and a second bearing component 32 coupled to the nacelle 4. The first bearing component 31 is configured to rotate with respect to the second bearing component 32 around the rotational axis 19.

Coupling the second bearing component to the nacelle may include connecting, e.g. bolting, the second bearing component to the support frame 9 of the nacelle or forming an integral part of the support frame 9. In this particular example, the second bearing component comprises a bracket 33 bolted to a portion of the support frame. The bracket 33 and the portion of the support frame form a gliding pad assembly partially enclosing the first bearing component. In some examples, the bracket may be formed from several pieces joined together, e.g. welded or bolted.

In this example, the first bearing 31 component is bolted to a flange 91 of the top portion of the tower 2. In other examples, the first bearing component may be integrally formed with the tower.

In this example, the annular gear 21 is formed integrally with first bearing component. The teeth of the annular gear are arranged outside the diameter defined by the tower and may be outwardly oriented. In other examples, the annular gear 21 may be connected to the first bearing component or to the tower 2. Yaw drives with a pinion (not illustrated in FIG. 4) may engage the annular gear 21 coupled (directly or indirectly) to the tower 2.

The gliding yaw bearing further comprises one or more axial gliding pads 51 arranged between the first bearing component 31 and the second bearing component 32. In this example, the axial gliding pads 51 are coupled to the first bearing component. The first bearing component 31 may comprise receptacles 34 for receiving the axial gliding pads. The axial gliding pads 51 may be fitted in the receptacles 34. The axial gliding pads may thus be retained by the receptacles.

Alternatively, or additionally, coupling the axial gliding pads to the first bearing component may comprise bolting or gluing or otherwise adhering the axial gliding pads to the first bearing component.

In these examples, the axial gliding pads may be arranged in the fixed part of the yaw bearing.

The nacelle 4 of FIG. 4 comprises a front side 17 or a coupling region. A rotor (not illustrated in FIG. 4) including a rotor hub and at least one rotor blade may be rotatably coupled to the nacelle 4, e.g. to the support frame 9, at the front side 17 or coupling region. In some examples, e.g. in some direct drive wind turbines, a generator may be arranged between the rotor and the nacelle. In these examples, the generator may be arranged at the front side 17. The rotor may thus be coupled to the support frame at the front side 17 through the generator.

In the example of FIG. 4, the generator and the rotor are coupled to the nacelle, e.g. to the support frame 9, at the front side 17. The center of gravity of the wind turbine is thus in a position forward from the rotational axis 19 of the wind turbine.

The weight of the rotor, when the generator is arranged inside the nacelle, and of the rotor and the generator, when the generator is arranged between the nacelle and the rotor, generates a tower for aft movement 18, which may modify the tilt of the nacelle. This may create an up and down movement of opposite parts of the nacelle.

In particular, the weight of the rotor and/or of the generator may create an upwards movement of the second bearing component with respect to the first bearing component in a rear side 16 of the nacelle, i.e. at the opposite side of the front side 17 or of the rotor. By this upwards movement, the pressure exerted by the second bearing component on the axial gliding pad(s) 51 arranged at the rear side 16 may be reduced. The nacelle may thus be slightly tilted by the action of the weight of the rotor and/or of the generator of the wind turbine.

Particularly, in direct drive wind turbines, the weight of the rotor and/or of the generator may release the pressure exerted by the second bearing component on the axial gliding pad(s) 51 arranged at the rear side 16 and a gap between the axial gliding pad(s) and the second bearing component may be created. This gap may allow the gliding pad(s) to be easily removed from the yaw bearing.

Figure 5:
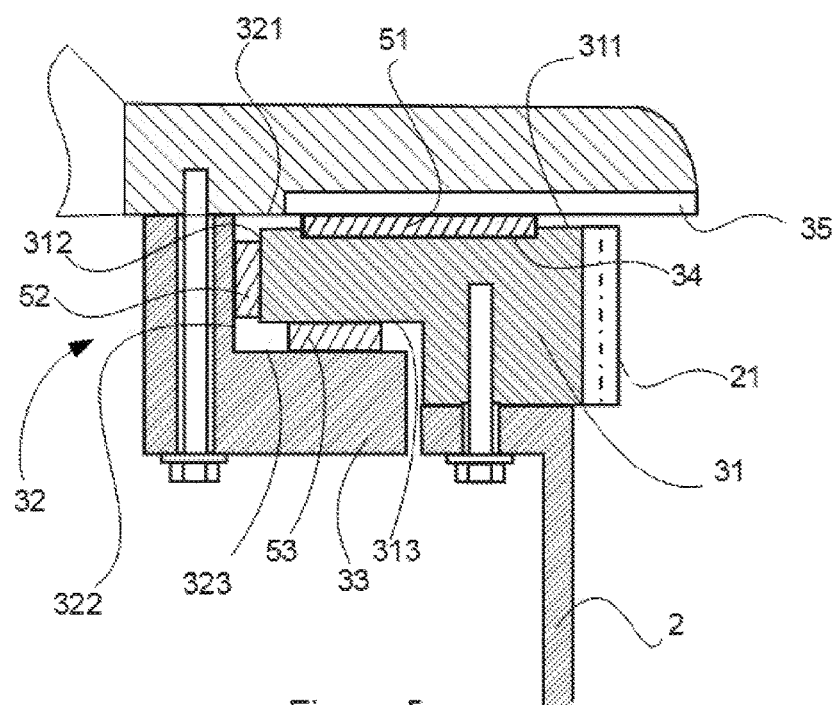
FIG. 5 schematically illustrates a close-up view of the rear side of the gliding yaw bearing of FIG. 4.

In some examples, the yaw bearing component may comprise a cut-out. In the example of FIG. 5, the cut-out 35 is arranged at the second bearing component, e.g. in a portion of the support frame 9. The cut-out 35 may be arranged at the rear side 16 of the nacelle, i.e. substantially at the opposite region of the front side of the rotor. This cut-out may be arranged in direct drive wind turbines and in wind turbines having a gearbox and a generator mounted inside the nacelle.

The cut-out 35 may allow accessing an axial gliding pad, regardless the type of wind turbine. In some examples, the axial gliding pad may be removed from the yaw bearing through the cut-out.

In some examples, the cut-out may allow reducing the pressure exerted by the bearing components on a selected gliding component. The cut-out may be a recess. In some examples, one of the bearing components does not contact at least one axial gliding pad in the region of the cut-out.

FIG. 5 is a close-up view of the rear side of the yaw bearing of FIG. 4. The first bearing component 31 in this example comprises a top axial gliding surface 311, a bottom axial gliding surface 313 and a radial gliding surface 312. These gliding surfaces may engage with the corresponding gliding surfaces of the second bearing component 32. The second bearing component 32 in these examples also includes a top axial gliding surface 321, a bottom axial gliding surface 323 and a radial gliding surface 322. The top axial gliding surface 311 of the first bearing component 31 may face the top axial gliding surface 321 of the second bearing component 32. Similarly, the bottom axial gliding surfaces and the radial gliding surfaces may respectively face to each other.

One or more axial gliding pads 51 may be arranged between the top axial gliding surfaces 311,321 of the first and the second bearing components. In addition to the axial gliding pads 51, the yaw bearing may further comprise bottom axial gliding pads 53 arranged between the bottom axial gliding surfaces 313, 323 and radial gliding pads 52 arranged between the radial gliding surfaces 312, 322. Accordingly, the friction between the gliding surfaces of the bearing components may be controlled. In some examples, the gliding pads may include grease or lubrication in order to reduce the friction coefficient and reduce or control noise. Vibrations of the nacelle may also be absorbed by the gliding pads.

In some examples, one or more of the gliding pads may comprise a pressure system for controlling the pressure provided by the gliding pads to the gliding surfaces. The friction between the adjacent gliding surfaces may thus be controlled. The pressure system may comprise a spring or a bolt that adjust the pressure between the two bearing components. In other examples, the pressure system may comprise pneumatic or hydraulic pre-tension elements.

The axial gliding pads 51 may be fitted in the receptacles 34 of the first bearing component 31. In this example, the top axial gliding surface 311 comprises the receptacles 34. The axial gliding pads may be coupled to the first bearing component 31.

In this example, the cut-out 35 is arranged at an outer side of the yaw bearing. The cut-out may communicate an outside the yaw bearing and an axial gliding pad 51. Accordingly, an axial gliding pad may be removed from the yaw bearing by substantially making this axial gliding pad coincide with the cut-out or opening. For example, the cut-out 35 may extend from an outer side to an inner side of the gliding pad. When the cut-out 35 substantially matches the axial gliding pad to be removed, as no pressure is exerted by the top axial gliding surface 321 on the gliding pad in this region, this axial gliding pad 51 may be removed from the yaw bearing, e.g. disengaged or extracted from the receptacle 34.

In some examples, such an axial gliding pad 51 may be removed to an outside the yaw bearing, e.g. an outside the tower and/or the nacelle through the cut-out 35. An axial gliding pad may be extracted outwardly through the cut-out 35.

In other examples, the cut-out may be arranged at an inner side of the yaw bearing. In these examples, the cut-out may communicate the top gliding surface 311 of the first bearing component and an inner side of the yaw bearing. An axial gliding pad may thus be extracted inwardly through the cut-out. Such an axial gliding pad may be removed to an inside the yaw bearing, e.g. an inside the tower and/or the nacelle through the cut-out.

The radial gliding pads 52 and the bottom axial gliding pads 53 may be coupled to the second bearing component 32. In this example, the radial and the bottom gliding pads are coupled to the bracket 33, e.g. glued to the bracket. The bracket 33 may comprise the bottom axial gliding surface 323 and the radial gliding surface 322. The bracket may be connected to the top axial gliding surface by e.g. bolts. Accordingly, the bracket 33 may be disconnected from the remaining part of the second bearing component, e.g. a portion of the support frame, and the radial gliding pads 52 and the bottom axial gliding pads 53 may be easily removed.

The top 311, 321 and the bottom axial gliding surface 313, 323 of the first bearing component 31 and of the second bearing component 32 may limit the up and down movement of the nacelle produced by the wind or by the weight of the rotor and/or the generator, by limiting the movement of the second bearing component 32 with respect to the first bearing component 31. In some examples, the bracket may limit the effect of the weight of the rotor.

Disconnecting the bracket 33 from the remaining portion of the second bearing component may thus increase the effect of tilting due to the weight of the rotor and/or the generator on the up movement of the support frame with respect to the first bearing component in the rear portion of the nacelle, i.e. the up movement of the top axial gliding surface 321 of the second bearing component with respect to the top axial gliding surface 311 of the first bearing component.

Figure 6:
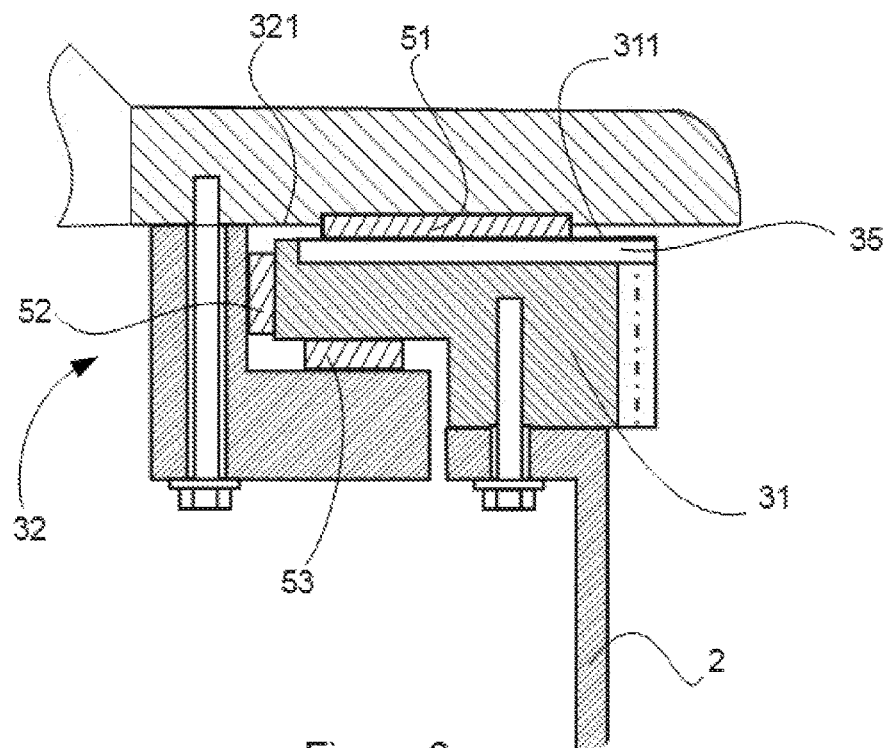
FIG. 6 schematically illustrates a close-up view of a portion of a gliding yaw bearing according to one example.

FIG. 6 schematically illustrates a close-up view of a portion of a gliding yaw bearing according to one example. Similar to the example of FIG. 5, the gliding yaw bearing comprises a first bearing component 31 configured to be coupled to a tower 2 of a wind turbine, a second bearing component 32 configured to be coupled to a nacelle of a wind turbine and one or more axial gliding pads 51 arranged between the first and the second bearing components. In addition, the gliding yaw bearing comprises a cut-out 35 for accessing at least one axial gliding pad of the one or more axial gliding pads.

However, in this example, the one or more axial pads 51 are coupled with the second bearing component 32, rather than with the first bearing component as in the example of FIG. 5. The axial gliding pads 51 are thus coupled with the movable part of the wind turbine.

The first bearing component 31 of FIG. 6 comprises the cut-out 35 for accessing at least one axial gliding pad of the one or more axial gliding pads 51. The cut-out 35 may be a recess arranged at the top axial gliding surface 311 of the first bearing component 31.

The axial gliding pads 51 may be attached, e.g. gluing or adhering or bolting, to the top gliding surface 321 of the second bearing component 32.

The cut-out 35 of FIG. 6 is configured to create a gap between the first bearing component 31 and at least one axial gliding pad of the one or more axial gliding pads. For example, at least one axial gliding pad 51 may not be contacted by the top gliding surface 311 of the first bearing component 31 at the region of the cut-out 35. Therefore, in this example, the axial gliding pad 51 is not clamped between the first and the second bearing component at the region of the cut-out 35. This is to say that at the region of the cut-out, the first bearing component does not exert pressure on the axial gliding pads.

Accordingly, the nacelle may be rotated to a position in which an axial gliding pad to be removed may substantially match the region of the cut-out 35 of the first bearing component 31. The axial gliding pad to be removed may thus be made coincide with the region of the cut-out 35.

As the pressure against the axial gliding pads at the cut-out region is released, the axial gliding pads may be removed from the second bearing component 32.

The cut-out 35 may be arranged at an outer side of the yaw bearing and may communicate an outside the yaw bearing and an axial gliding pad 51. An axial gliding pad may thus be removed to an outside the yaw bearing, e.g. an outside the tower and/or the nacelle through the cut-out 35. For example, an axial gliding pad may be extracted outwardly through the cut-out 35.

Figure 7:
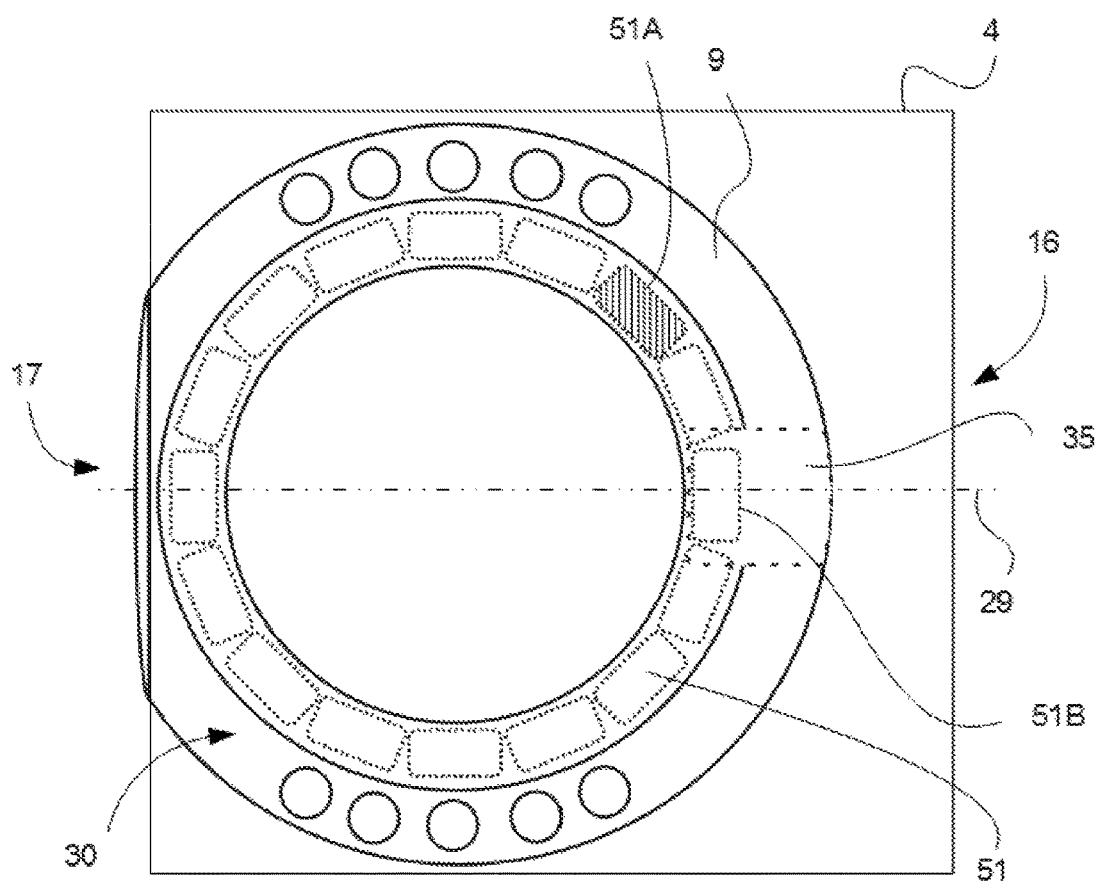
FIG. 7 schematically represents a top view of a portion of a nacelle and a yaw bearing according to one example.

FIG. 7 schematically represents a top view of a portion of a nacelle 4 and a yaw bearing according to one example. Some components of the yaw bearing are actually not visible from this top view, for this reason axial gliding pads 51 and an cut-out 35 have been represented in dotted lines. The nacelle 4 extends from a front side 17 to a rear side 16 along the axis 29.

The nacelle comprises a support frame 9 which may also extend from the front side 17 to the rear side 16 along the axis 29.

In wind turbines having a drive train with a gearbox, a rotor may be coupled to the nacelle, e.g. to the support frame 9, at the front side 17. The support frame 9 thus supports the rotor.

In direct drive wind turbines, one side of a generator may be coupled to the rotor and the other side to the front side 17. In these examples, both the rotor and the generator are thus supported by the support frame 9.

The yaw bearing 30 comprises a first bearing component and a second bearing component (not represented in FIG. 7) and one or more axial gliding pads arranged between them according to any of the examples herein described. In this example, the one or more axial gliding pads 51 are coupled with the first bearing component, i.e. are arranged at the fixed part of the bearing.

The yaw bearing of this example comprises several axial gliding pads 51, e.g. 16 axial gliding pads, extending along at least a portion of a perimeter of the yaw bearing.

In some examples, the axial gliding pads 51 may substantially extend along the whole perimeter of yaw bearing. In some examples, the axial gliding pads may be substantially uniformly distributed along the first bearing component. In other examples, the axial gliding pads may be arranged only at regions of the first bearing component wherein higher axial loads are expected.

In some examples, the yaw bearing may comprise between 10 and 50 axial gliding pads, specifically between 15 and 40. In some examples, the yaw bearing may comprise between 20 and 30 axial gliding pads.

The axial gliding pads may have a substantially rectangular shape. In this disclosure, a length of an axial gliding pad shall be understood as the extension of the axial gliding pad along a portion of a perimeter of the yaw bearing. A width shall be understood as the extension along a radial direction, i.e. extending between a radially inner side to a radially outer side of the yaw bearing. A depth may be understood as the extension along an axial direction, i.e. extending parallel to the rotational axis of the nacelle.

The axial gliding pads may have a length of between 250 mm (approximately 9.84 inches) to 1000 mm (approximately 39.37 inches), specifically between 500 mm (approximately 19.68 inches) to 900 mm (approximately 35.43 inches). The axial gliding pads may have a width of between 100 mm (approximately 3.93 inches) and 400 mm (approximately 15.75 inches), specifically between 150 mm (approximately 5.91 inches) and 300 mm (approximately 11.81 inches). The depth of the axial gliding pads may be between 20 mm (approximately 0.79 inches) and 200 mm (approximately 7.87 inches), specifically between 20 mm (approximately 0.79 inches) and 100 mm (approximately 3.94 inches).

In the example of this figure, a portion of the support frame 9 comprises a cut-out 35 arranged at the rear side 16. This cut-out 35 may communicate an outside the yaw bearing and an axial gliding pad. An axial gliding pad may be removed from this cut-out.

In some examples, a tool may be inserted through the cut-out 35 and an axial gliding pad may be removed from the yaw bearing inwardly. A gliding axial pad may be pushed through the cut-out towards the rotational axis. An operator inside the tower or the nacelle may pick the removed axial gliding pad up. A gliding axial pad may be removed to a region inside a diameter defined by the yaw bearing.

In some examples, an axial gliding pad may be removed outwardly through the cut-out 35. A tool may be used for removing an axial gliding pad from inside the yaw bearing. An axial gliding pad may thus be extracted through the cut-out. A platform may be arranged for supporting an operator performing this operation. This platform may be placed inside the nacelle 4. Removing an axial gliding pad to a region outside a diameter defined by the yaw bearing may be performed inside the nacelle. Braking units and other components of the yaw system placed in an inner side of the yaw bearing may not interfere with removing an axial gliding pad.

In some examples, the cut-out 35 may have a size suitable for extracting a gliding pad or for preventing the contact between the upper gliding surface of the second bearing component and an axial gliding pad to be removed. The cut-out may have a length of between 300 mm (approximately 11.81 inches) and 1500 mm (approximately 55.06 inches), specifically between 800 mm (approximately 31.50 inches) and 1200 mm (approximately 47.24 inches).

A length of the cut-out shall be understood as the extension of the cut-out substantially perpendicular to the axis 29, i.e. tangential to the yaw bearing.

In some examples, the cut-out 35 may have a length of between 200% and 90% of the length of the axial gliding pads, specifically between 150% and 100%.

In FIG. 7, the pressure exerted by the second bearing component on the axial gliding pads is not uniform. In FIG. 7, the region of the second bearing component having the cut-out exerts less pressure on the axial gliding pads than in other regions of the second bearing component. Therefore, the pressure exerted by the axial sliding surface on the axial gliding pad 51B may be inferior to the pressure exerted on the gliding pad 51A. In some examples, the second bearing component may not contact at least one axial gliding 51B arranged substantially matching with the cut-out 35.

In some examples, the weight supported by the front side 17 may tilt the nacelle forwards, in particular in direct drive wind turbines.

Particularly in direct drive wind turbines, the axial gliding surface of the second bearing component at the rear portion 16 may tend to move up. The pressure exerted by the axial gliding surface on the gliding pad 51B may thus be inferior to the pressure exerted on the gliding pad 51A.

In some examples, the pressure exerted by the second bearing component on an axial gliding pad to be removed may be released by the cut-out arranged at the top axial gliding surface of the second bearing component.

In some examples, the pressure exerted by the second bearing component on an axial gliding pad to be removed may be released by the effect of the weight of the rotor and/or of the generator. This may be in direct drive wind turbines.

In some examples, both the effect weight of the rotor and/or the generator and the cut-out may release the pressure exerted by the second bearing component on the axial gliding pad to be removed.

In this Figure, the gliding pad 51A is selected to be removed. However, the orientation of the nacelle does not allow removing this axial gliding pad 51A from this position.

Figure 8:
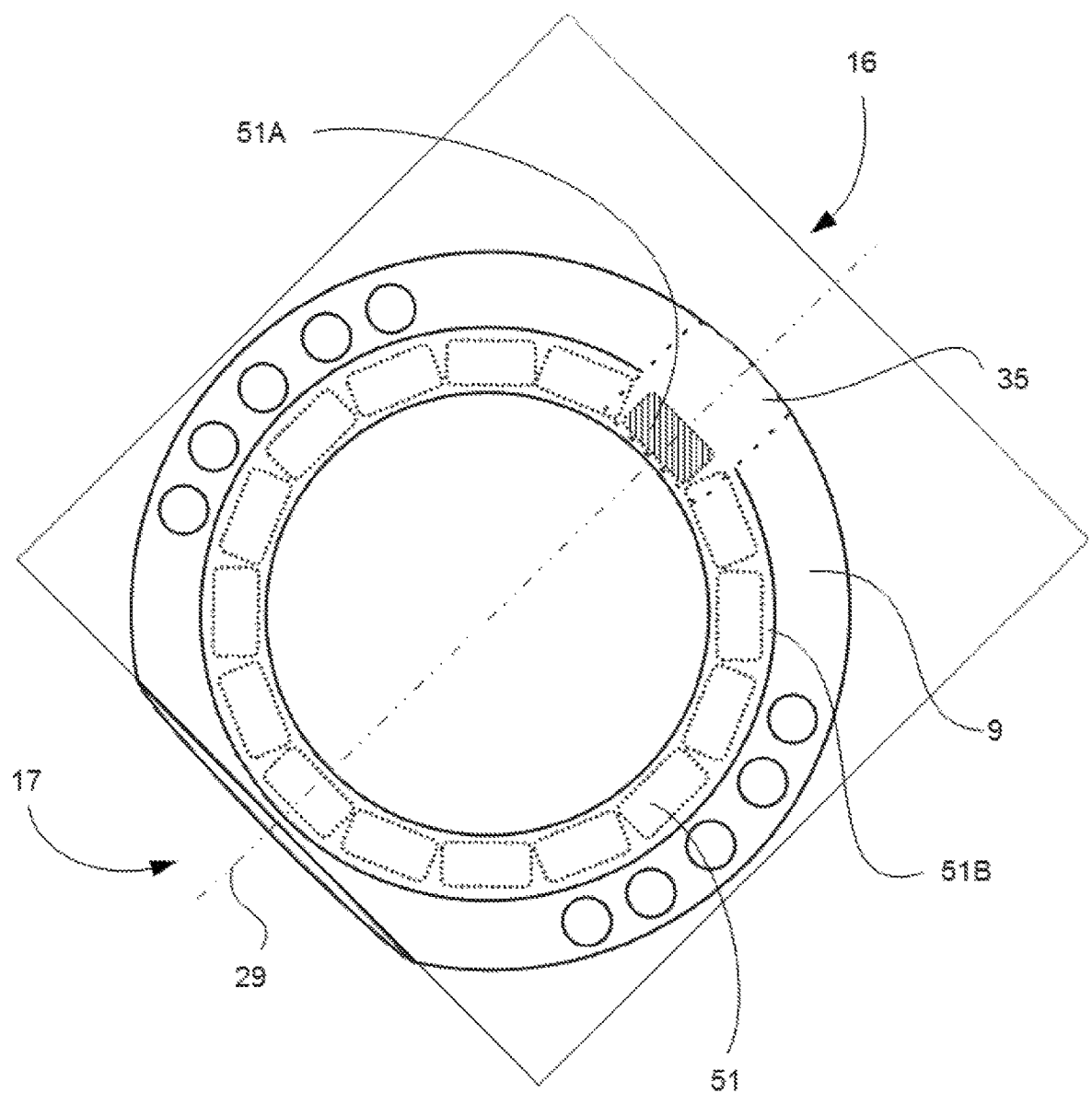
FIG. 8 schematically represents the top view of FIG. 7 wherein the nacelle is in a removal position.

FIG. 8 schematically represents the top view of a portion of FIG. 7 wherein the nacelle is in a removal position. The nacelle rotates around the rotational axis from FIG. 7 to FIG. 8 to a removal position. In this removal position, the axial gliding pad 51A may be removed. In this position, the front side 17 is positioned substantially diametrically opposite to the axial gliding pad 51A to be removed. This is to say that the axial gliding pad to be removed 51A is substantially at or closed to the rear portion 16 of the support frame 9 or nacelle. The rear portion 16 may thus match the position of the axial gliding pad to be removed 51A.

In some examples, in this removal position, the cut-out may match the axial gliding pad to be removed 51A. The weight of the rotor and/or of the generators may release or help to release the force of the second bearing component against the axial gliding pad to be removed 51A. The axial gliding pad 51A may thus be removed.

Removing the axial gliding pad 51A may be facilitated by the cut-out 35. The cut-out may increase the distance between the top axial surfaces of the first and the second components. In the removal position, the cut-out may substantially match the axial gliding pad 51A.

Accordingly, rotating the nacelle for removing an axial gliding pad may also be used in those wind turbines wherein the weight of the rotor and/or of the generator is not capable of moving away in a sufficient manner the second bearing component with respect the first bearing component. This may be the case in wind turbines having a gearbox arranged inside the nacelle.

In those examples wherein the axial gliding pads are coupled with the second bearing component 32 and the first bearing component comprises a cut-out, the nacelle may be rotated as previously described. However, in these examples, the nacelles may rotate in order to make an axial gliding pad to be removed coincide with the region of the cut-out of the first bearing component.

Figure 9:
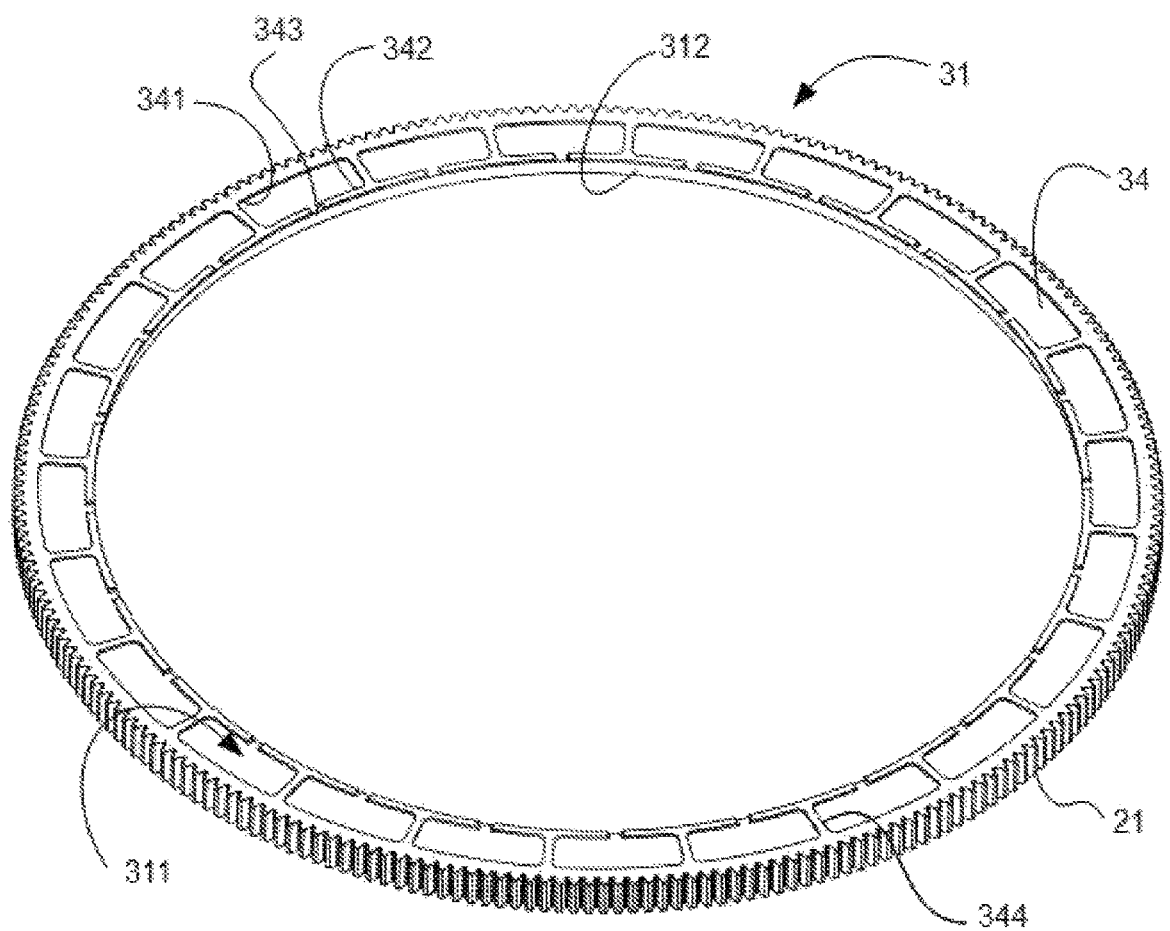
FIG. 9 schematically illustrates a first bearing component according to one example.

FIG. 9 schematically illustrates a first bearing component according to one example. The first bearing component 31 of FIG. 9 comprises one or more receptacles 34. In this example, the top axial gliding surface 311 comprises these receptacles 34. In this example, the first bearing component comprises an annular gear 21. The annular gear 21 and the first bearing component 31 may be integrally formed in a single piece. For example, the first bearing component may be manufactured by casting.

In some examples, the receptacles 34 may extend along at least a portion of a perimeter of the first bearing component 31. In some examples, the receptacles 34 may substantially extend along the whole perimeter of the first bearing component 31. In some examples, the receptacles may be substantially uniformly distributed along the first bearing component. In other examples, the receptacles may be arranged only at regions of the first bearing component wherein higher axial loads are expected.

In some examples, one axial gliding pad may be arranged in one receptacle 34. In these examples, length and width of the receptacles may be similar to the length and width of the axial gliding pads. In this way, length and width of the receptacles may be according to any of the examples of axial gliding pads herein disclosed. In other examples, several axial gliding pads may be arranged at a single receptacle. In these examples, size of the receptacles may be suitable for engaging the axial gliding pads.

A depth of the receptacles may be higher than the depth of the axial gliding pads. The axial gliding pad may thus be clamped between the gliding upper surface 311 of first bearing component and the gliding upper surface of the second bearing component.

In the example of FIG. 9, the receptacles 34 are separated by bridges 344. These bridges 344 may connect the radial gliding surface 312 and the annular gear 21.

The receptacles 34 may comprise an outer radial sidewall 341. Outwardly movements of the axial gliding pads may thus be prevented.

Additionally, or alternatively, the receptacles 34 may comprise an inner radial sidewall 342. Inwardly movements of the axial gliding pads may thus be prevented. In the examples of receptacles having an inner radial sidewall 342 and an outer radial sidewall 341, coupling between the axial gliding pad and the first bearing component 31 may thus be enhanced.

In FIG. 9 the inner radial sidewall 342 comprises a notch 343. The notch 343 may have a shape suitable for inserting a lever tool. A lever tool, e.g. screwdriver, may thus be inserted in the notch 343 to disengage the axial gliding pad from the receptacle 34.

In a further aspect, a wind turbine is provided. The wind turbine comprises a tower and a nacelle mounted on the tower and extending between a front side to a rear side. The wind turbine further comprises a rotor including a rotor hub and at least one rotor blade, the rotor being arranged at the front side. In addition, the wind turbine comprises a gliding yaw bearing for rotating the nacelle with respect to the tower.

The gliding yaw bearing may be according to any of the examples herein disclosed.

In some examples, the gliding yaw bearing may comprise a cut-out for accessing one gliding pad. The cut-out may be arranged substantially diametrically opposite to the front side of the nacelle.

In some examples, the second bearing component, e.g. a portion of the support frame, may comprise the cut-out. The cut-out may be arranged at the rear side of the nacelle, e.g. at the rear portion of the support frame.

In some examples, the gliding yaw bearing may comprise a first bearing component coupled to the tower and a second bearing component coupled to the nacelle. The first bearing component may be configured to rotate with respect to the second bearing component. In addition, the gliding yaw bearing may comprise one or more axial gliding pads arranged between the first and the second bearing components.

In some examples, the axial gliding pads may be coupled with the first bearing component. In these examples, the first bearing component may comprise one or more receptacles. Each of the receptacles may be configured to receive at least one of the axial gliding pads.

The axial gliding pads may be arranged between the top axial gliding surface 311, 321 of the first and second bearing components.

The axial gliding pads may thus be connected to the first bearing component. Each of the receptacles may engage with at least one of the axial gliding pads.

The nacelle may comprise a support frame. In some examples, the second bearing component may comprise a portion of the support frame.

In some examples, the axial gliding pads may be coupled with the second bearing component 32. In these examples, the yaw bearing may comprise a cut-out 35 arranged at the first bearing component 31.

In some examples, the wind turbine may be directly driven, i.e. the wind turbine may be a direct drive wind turbine. In other examples, the wind turbine may be driven by a gearbox coupled with the rotor through a shaft. The gearbox may be arranged inside the nacelle, e.g. supported by the support frame.

Figure 10:
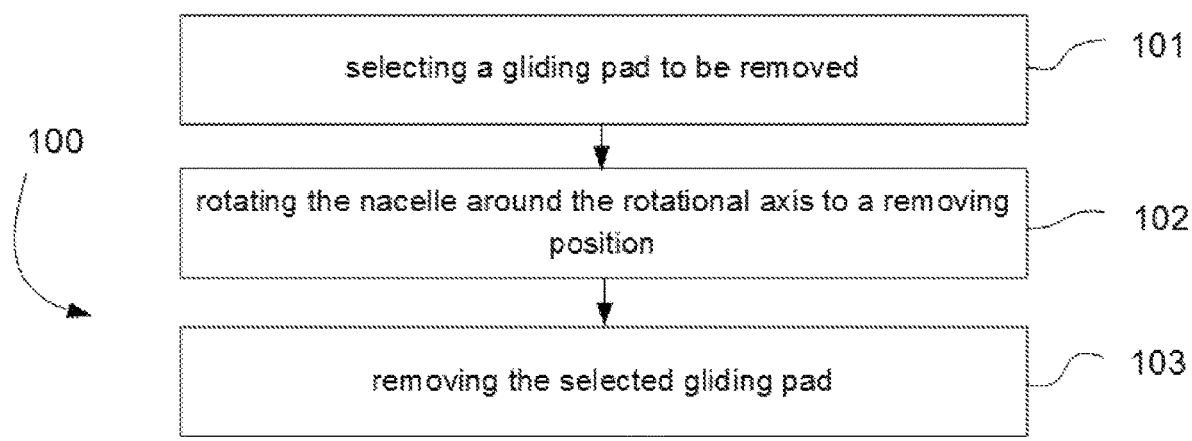
FIG. 10 is a flow diagram of a method for removing an axial gliding pad of a gliding yaw bearing according to one example.

FIG. 10 is a flow diagram of a method for removing gliding pad of a gliding yaw bearing of a wind turbine.

The method 100 for removing an axial gliding pad of a gliding yaw bearing comprises selecting 101 a gliding pad to be removed. At block 102 rotating a nacelle that is rotatably mounted on a tower through the gliding yaw bearing to a removal position is represented. In the removal position, the front side is positioned substantially diametrically opposite to the selected gliding pad, such that the pressure exerted on the selected pad is released. In the removal position, the selected gliding pad to be removed is substantially positioned at the rear side of the nacelle. In the removal position, the rear side of the nacelle is substantially positioned close or at the region of the selected gliding pad.

Block 103 represents removing the selected gliding pad. When the pressure exerted on the gliding pad to be removed is sufficiently low, this gliding pad may be removed.

The wind turbine may comprise a tower, a rotor including a rotor hub and at least one rotor blade and a nacelle mounted on the tower and extending from a front side to a rear side. The rotor may be arranged at the front side of the nacelle.

The gliding yaw bearing may comprise a first bearing component coupled to the tower and a second bearing component coupled to the nacelle. The first bearing component is configured to rotate with respect to the second bearing component. In addition, the gliding yaw bearing comprises one or more axial gliding pads arranged between the first and the second bearing components, in such a way that the first and the second bearing components exert a pressure on the gliding pads.

In some examples, a gap may be created between the selected guiding pad and one of the first and second bearing components.

In some examples, the method may comprise removing the selected gliding pad in a direction moving away from the front side. Alternatively, the method may comprise removing the selected gliding pad in a direction towards the front side.

In some examples, the pressure may be released by the action of the weight of the rotor and/or of the generator. The method may further comprise tilting the nacelle at the removal position by the action of the weight of a rotor and/or a generator of the wind turbine.

In direct drive wind turbines, the generator may be arranged between the rotor and the nacelle. In these examples, the weight of the rotor and/or the generator is displaced from the rotational axis of the nacelle. This weight may tilt the nacelle towards the front side. This tilt towards the rotor region may allow a portion of the nacelle in a region opposite to the front side, i.e. in a rear side, to be moved away from the tower. Consequently, as the first and the second bearing components are respectively coupled to the tower and to the nacelle, the second bearing component may be moved away from the first bearing component in the region opposite to front side, i.e. opposite to the rotor. This relative displacement may release the pressure exerted by the second bearing component on the axial gliding pad and a gap between the bearing components sufficient for removing the selected axial gliding pad may be created.

This method may get benefit from having the center of gravity of the direct drive wind turbine in a position forward from the rotational axis of the wind turbine, i.e. the center of gravity is displaced towards the rotor region of the wind turbine. Therefore, existing components of wind turbines, e.g. the rotor and the generator, may be used to go up a portion of the second bearing component with respect to the first bearing component when the nacelle is positioned in a removal position.

In some of these examples, the second bearing component may comprise a bracket according to any of the examples herein described. The bracket may be connected to a portion of the second bearing component, e.g. to a portion of the support frame, and the bracket may partially enclose the first bearing component. The method may further comprise disconnecting the bracket form the portion of the second bearing component. When the bracket is connected to the portion of the second bearing component, up and down movements of the second bearing components with respect to the first bearing component may be prevented. The tilting effect generated by the weight of the rotor and/or of the generator may thus be enhanced by disconnecting the bracket from the portion of the second bearing component, e.g. a portion of the support frame.

Alternatively, or additionally, the pressure on the axial gliding pad to be removed may be released by providing a cut-out at the gliding yaw bearing, e.g. at the second bearing component. The second bearing component may thus comprise a cut-out arranged substantially at the opposite region of the front side.

In some examples, the first bearing component may comprise receptacles according to any of the examples herein disclosed. A lever tool may be used for disengaging the axial gliding pad to be removed from the receptacle. A notch may be provided in the receptacles for inserting the lever tool. The selected axial gliding pad may be easily removed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for removing a gliding pad of a gliding yaw bearing of a wind turbine comprising:
   selecting the gliding pad to be removed;
   rotating a nacelle that is rotatably mounted on a tower through the gliding yaw bearing to a removal position in which a front side of the nacelle at which a rotor is arranged is positioned substantially diametrically opposite to the selected gliding pad, such that a pressure exerted on the selected gliding pad is released;
   removing the selected gliding pad; and
   tilting the nacelle at the removal position by an action of weight of one or both of the rotor or a generator of the wind turbine.

2. The method according to claim 1, wherein the selected gliding pad is removed in a direction moving away from the front side.

3. The method according to claim 1, wherein the selected gliding pad is removed in a direction towards the front side.

4. The method according to claim 1, wherein the gliding yaw bearing comprises a cut-out for accessing the selected gliding pad.

5. The method according to claim 1, wherein the gliding yaw bearing comprises a first bearing component coupled to the tower and a second bearing component coupled to the nacelle, and wherein the first hearing component comprises a plurality of receptacles configured to receive the gliding pads.

6. The method according to claim 5, wherein the removing of the selected gliding pad comprises using a lever tool to lift the selected gliding pad from the receptacle.

7. The method according to claim 6, wherein the receptacles comprise a radially outer sidewall and a radially inner sidewall having a notch allowing access for the lever tool.

8. The method according to claim 1, wherein the gliding yaw bearing comprises a first bearing component coupled to the tower and a second bearing component coupled to the nacelle, and wherein the second bearing component comprises a bracket that partially enclosing the first bearing component, and the method comprising disconnecting the bracket from the portion of the second bearing component.

* * * * *